Nov. 25, 1947.   H. O. WENDT   2,431,529
ELEVATOR AND TAB CONTROL MECHANISM
Filed April 9, 1946
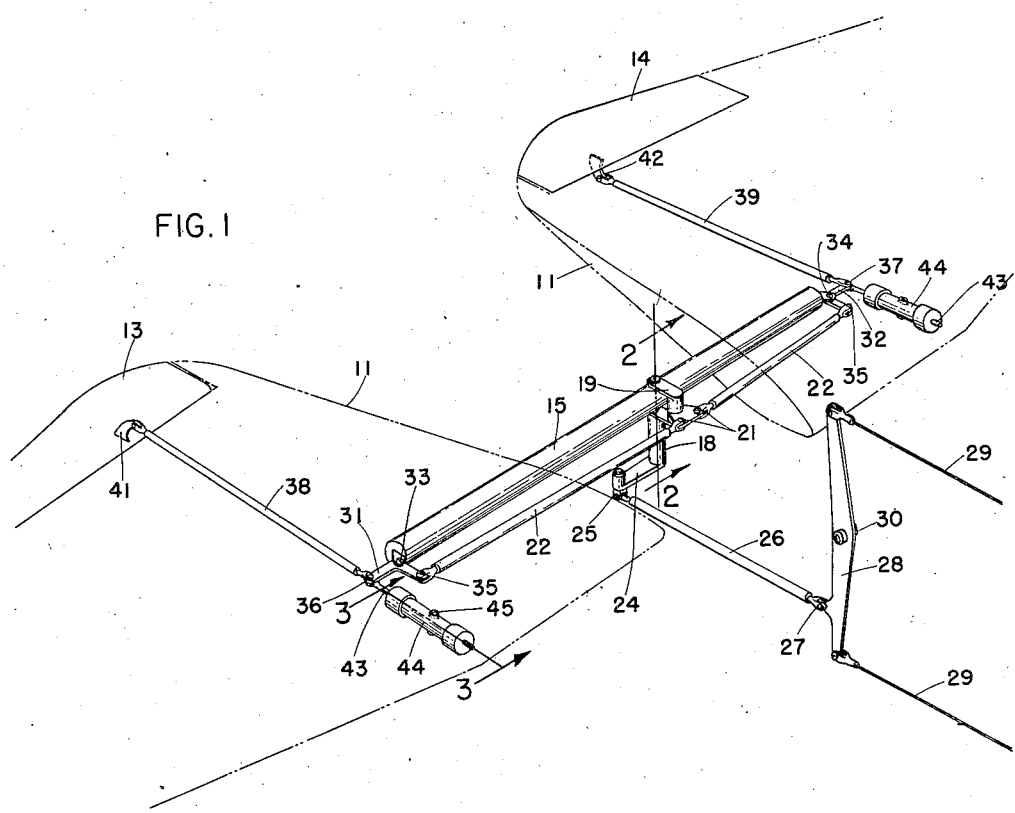
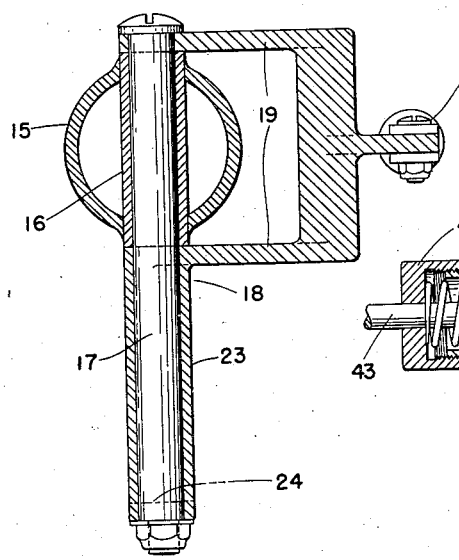
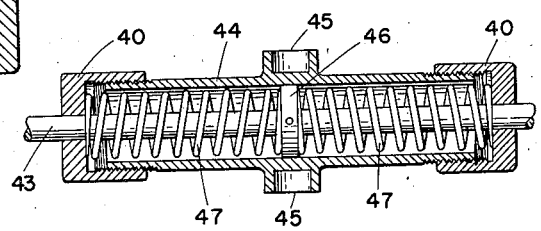
INVENTOR.
HAROLD O. WENDT
BY *Richard W. Treverton*
ATTORNEY Patented Nov. 25, 1947

2,431,529

UNITED STATES PATENT OFFICE 2,431,529

ELEVATOR AND TAB CONTROL MECHANISM

Harold O. Wendt, Columbus, Ohio, assignor to Curtiss-Wright Corporation, a corporation of Delaware Application April 9, 1946, Serial No. 660,703

14 Claims. (Cl. 244—82)

1

The present invention relates to means for controlling aircraft and more particularly to means for actuating elevators or similar control surfaces.

In heavy aircraft, the static loads and air loads on control surfaces are frequently of such magnitude that it is desirable to provide auxiliary surfaces which can be operated easily by the pilot and which function to move the primary control surfaces or to aid the pilot in moving them. Such auxiliary airfoils or tabs are also desirable in smaller aircraft, especially military types, which may be operated at high speeds and where the air loads on the primary controls are also large. Auxiliary airfoils of this kind may advantageously be connected directly to the control linkage operated by the pilot, while the primary control airfoil is connected to the linkage through a play connection, especially a resilient play connection, in such manner that direct pilot control of the primary control airfoil is enabled when only light loads on the airfoil system are present, or when control movements of unusually large amplitude are required.

The present invention provides a simple and compact linkage arrangement for connecting the primary and auxiliary surfaces with the pilot control system. In a preferred form of the invention a bell crank is connected to the primary airfoil assembly by a pivot whose axis is substantially normal to the axis on which the airfoil is pivoted to the aircraft. One arm of the bell crank is disposed in spaced relation to the airfoil pivot axis and is connected to means movable by the pilot in such manner that the bell crank and airfoil assembly may move as a unit or may move differentially, the differential motion being translated into movement of the auxiliary airfoil by linkage connected to another arm of the bell crank.

The linkage is such that it may be mounted as a unit upon a torsion member or the like which may be utilized to distribute control forces to the airfoil construction, and it is applicable with especial advantage to, although it is not limited to, split airfoil constructions such as elevator constructions wherein one elevator is located on each side of the fuselage and both are mounted upon a common torque tube assembly.

The foregoing and other objects and advantages will become apparent from the following description of the typical embodiment of the invention shown in the accompanying drawings, wherein:

Figure 1 is a perspective view of the operating

2 linkage system applied to the elevator and elevator tab elements of an aircraft, the elevator elements being shown by broken lines;

Figure 2 is a detail sectional view taken along line 2—2 of Figure 1; and,

Figure 3 is a detail sectional view taken along line 3—3 of Figure 1.

As shown in the drawings, the aircraft is provided with spaced airfoils in the form of elevators 11, one being adapted for disposition on each side of a fuselage (not shown), and each having hinged thereto at its trailing edge an auxiliary airfoil or tab, the latter being designated 13 and 14. Both elevators 11 are secured to a torque tube 15 which may be mounted by any suitable means upon the aircraft for pivotal movement about its longitudinal axis.

Medially of its ends, the tube 15 is provided with a bushing 16 through which extends a bolt 17 which serves as a pivot pin for a bell crank 18. This member comprises a U-shaped arm portion 19 straddling the bushing 16 and pivoted at 21 to links 22, a sleeve portion 23 upon bolt 17, and a crank arm portion 24. The outer end of the latter is joined by a universal connection 25 to a link 26 whose forward end is pivoted at 27 to a control lever 28. Pivoted at 30 to a fixed part of the aircraft structure (not shown), the lever may be connected by cables 29 and other suitable adjuncts to the control column or the like in the pilot's compartment of the aircraft.

Bell cranks 31 and 32 are pivoted at 33 and 34, respectively, to the torque tube 15, their forwardly extending arms being connected by pivots 35 to the outer ends of links 22. The laterally extending arms of these bell cranks are pivoted at 36 and 37, respectively, to links 38 and 39, which in turn are pivoted to horns 41 and 42 on tabs 13 and 14. It will be noted that horn 41 projects upwardly from tab 13 while horn 42 depends from tab 14, so that upon clockwise movement of the bell cranks (31, 18 and 32) about their respective pivots, both tabs will be lowered and upon counterclockwise movement of the bell cranks, both will be raised.

Also pivoted at 36 and 37 to the bell cranks 31, 32 are rods 43 each extending through caps 40 of a spring cartridge casing 44 the details of which are shown in Figure 3. Each casing 44 is provided with trunnions 45 by means of which it may be pivoted within the elevator structure 11. Secured to each rod 43 within its casing 44 is a collar 46; and around the rods, confined between collar 46 and caps 40, are coil springs 47. These springs constitute means for resiliently resisting movement of the bell cranks and tabs 13, 14 relative to the elevator assembly including members 11 and 15. The compression of the springs may be changed to vary the degree of resistance by adjusting the caps 40 upon casing members 44, the caps being screw-threaded to the casings for this purpose.

In operation, it will be seen that clockwise movement of the control lever 28 effected through cables 29 by an up-elevator movement of the pilot control system will produce a rearward thrust on link 26 which will tend to rotate bell crank 18 clockwise about pivot 17 and, since arm 24 is spaced below the pivot axis of torque tube 15, will also tend to rotate the whole elevator assembly clockwise about the latter axis. In the event air loads and other loads upon the elevator assembly are small, the resistance of springs 47 will hold the elevators and tabs against relative movement, and the whole assembly will be moved clockwise about the pivot axis of tube 15 or to an up-elevator position by the pilot's control action. If loads upon the assembly are such that this action is substantially resisted, the bell crank 18 will be moved clockwise about pivot 17, which through linkage 22, 31, 38, and 32, 39 will swing both tabs 13, 14 downwardly against the resilient resistance of springs 47. Reaction of the airstream upon the downwardly deflected tabs will be effective to elevate, or to aid the pilot in elevating, the elevators 11.

In the opposite, or down-elevator movement, of the control system, the parts will function in a similar but reverse manner to that described in the preceding paragraph: lever 28 being swung counterclockwise will move the outer end of arm 24 forwardly to directly produce either a down movement of the whole elevator assembly or an up movement of tabs 13, 14, or, simultaneously both down-elevator and up-tab movements. It will be understood that the spring cartridges 40, 44, 46, 47 may be so proportioned, or that other means may be provided, to limit relative movement of the tabs and elevators, so that after such movement has taken place, further movement of the control lever 28 by the pilot will result in positive movement of the elevators.

It will be further understood that the arrangements and formations of parts as shown and described herein are merely illustrative of the invention principles involved, and that these principles may be otherwise embodied without departing from the spirit of the invention or the scope of the appended claims.

I claim:

1. In an aircraft having a pair of airfoils each provided at its trailing edge with a hinged tab, a torque tube pivoted to the aircraft and secured to said airfoils, a bell crank pivoted to the torque tube on an axis substantially normal to the torque tube pivot axis, said bell crank having an arm spaced from the torque tube axis connected to a control linkage whereby movement of the latter may swing the airfoil assembly about the torque tube axis or swing the bell crank relative to the torque tube, or both, an actuating bell crank for each tab carried by said torque tube and provided with an operating connection to the tab, link means connecting the first mentioned bell crank to each of the tab actuating bell cranks, and resilient means carried by each elevator and connected to the related tab actuating bell crank for resisting movement of the latter relative to the torque tube.

2. In an aircraft having a pair of airfoils each provided at its trailing edge with a hinged tab, a torque tube pivoted to the aircraft and secured to said airfoils, a bell crank pivoted to the torque tube on an axis substantially normal to the torque tube pivot axis, said bell crank having an arm connected to a control linkage in spaced relation to the torque tube axis whereby movement of the linkage may swing the airfoil assembly about the torque tube axis or swing the bell crank relative to the torque tube, or both, an actuating bell crank for each tab carried by said torque tube and provided with an operating connection to the tab, and link means connecting the first mentioned bell crank to each of the tab actuating bell cranks.

3. In an aircraft having a pair of airfoils each provided at its trailing edge with a hinged tab, a torque tube pivoted to the aircraft and secured to said airfoils, a bell crank pivoted to the torque tube on an axis substantially normal to the torque tube pivot axis, said bell crank having an arm connected to a control linkage in spaced relation to the torque tube axis whereby movement of the linkage may swing the airfoil assembly about the torque tube axis or swing the bell crank relative to the torque tube, or both, an actuating bell crank for each tab carried by said torque tube and provided with an operating connection to the tab, link means connecting the first mentioned bell crank to each of the tab actuating bell cranks, and means for resiliently resisting movement of the first mentioned bell crank relative to the torque tube.

4. In an aircraft having a pair of airfoils each having an auxiliary airfoil hinged thereto, a torque tube pivoted to the aircraft and secured to said first mentioned airfoils, a member pivoted to the torque tube on an axis substantially normal to the torque tube axis, said member having a crank arm connected to control means in spaced relation to the torque tube axis whereby the control means may move the bell crank and torque tube together or differentially, means for resiliently resisting movement of the member relative to the torque tube, and means connecting the member to each of said auxiliary airfoils for moving them relative to the first mentioned airfoils by and during relative movement of the bell crank and member.

5. In an aircraft having a pair of airfoils each having an auxiliary airfoil hinged thereto, a torque tube pivoted to the aircraft and secured to said first mentioned airfoils, a member pivoted to the torque tube on an axis substantially normal to the torque tube axis, said member having a crank arm connected to control means in spaced relation to the torque tube axis whereby the control means may move the bell crank and torque tube together or differentially, and means connecting the member to each of said auxiliary airfoils for moving them relative to the first mentioned airfoils by and during relative movement of the bell crank and member.

6. In an aircraft having an airfoil assembly pivoted thereto, said assembly having a pair of auxiliary airfoils movably connected thereto, a bell crank pivoted to said assembly on an axis substantially normal to the axis upon which said assembly is pivoted to the aircraft and including an arm spaced from the latter axis, control means connected to said arm for moving the bell crank relative to said assembly or as a unit therewith, an actuating bell crank for each auxiliary airfoil carried by said assembly, means connecting the first mentioned bell crank to each of said actuating bell cranks, and means carried by said assembly and connected to each of said actuating bell cranks for resiliently resisting movement of the latter relative to said assembly.

7. In an aircraft having an airfoil assembly pivoted thereto, said assembly having a pair of auxiliary airfoils movably connected thereto, a bell crank pivoted to said assembly on an axis substantially normal to the axis upon which said assembly is pivoted to the aircraft and including an arm spaced from the latter axis, control means connected to said arm for moving the bell crank relative to said assembly or as a unit therewith, an actuating bell crank for each auxiliary airfoil carried by said assembly, means connecting the first mentioned bell crank to each of said actuating bell cranks, and means for resiliently resisting movement of the first mentioned bell crank relation to said assembly.

8. In an aircraft having an airfoil assembly pivoted thereto, said assembly having a pair of auxiliary airfoils movably connected thereto, a bell crank pivoted to said assembly on an axis substantially normal to the axis upon which said assembly is pivoted to the aircraft and including an arm spaced from the latter axis, control means connected to said arm for moving the bell crank relative to said assembly or as a unit therewith, an actuating bell crank for each auxiliary airfoil carried by said assembly, and means connecting the first mentioned bell crank to each of said actuating bell cranks.

9. In an aircraft having an airfoil with an auxiliary airfoil hinged thereto, a torque tube carrying the first mentioned airfoil and pivoted to the aircraft, a bell crank pivoted to the torque tube on an axis substantially normal to the torque tube pivot axis and having an arm spaced from the latter axis, said arm being connected to control means for movement thereby about either or both of said axes, a second bell crank carried by said torque tube, said second bell crank having a connection to the first mentioned bell crank and a connection to the auxiliary airfoil for moving the latter upon movement of the first mentioned bell crank relative to the torque tube.

10. In an aircraft having an airfoil with an auxiliary airfoil hinged thereto, a torque tube carrying the first mentioned airfoil and pivoted to the aircraft, a bell crank pivoted to the torque tube on an axis substantially normal to the torque tube pivot axis and having an arm spaced from the latter axis, said arm being connected to control means for movement thereby about either or both of said axes, a second bell crank carried by said torque tube, said second bell crank having a connection to the first mentioned bell crank and a connection to the auxiliary airfoil for moving the latter upon movement of the first mentioned bell crank relative to the torque tube, and means for resiliently resisting movement of the auxiliary airfoil relative to the first mentioned airfoil.

11. In an aircraft having an airfoil pivoted thereto, an auxiliary airfoil pivoted to the first mentioned airfoil, means for resiliently resisting relative movement of said airfoils, a pair of bell cranks pivoted to the first mentioned airfoil, means connecting said bell cranks for movement about their respective pivot axes, one bell crank having an operating connection to the auxiliary airfoil, the other bell crank having its pivot axis substantially normal to the axis upon which the first airfoil is pivoted to the aircraft and having an arm spaced from the latter axis connected to control means for movement thereby about either or both of said axes.

12. In an aircraft having an airfoil pivoted thereto, an auxiliary airfoil pivoted to the first mentioned airfoil, a pair of bell cranks pivoted to the first mentioned airfoil, means connecting said bell cranks for movement about their respective pivot axes, one bell crank having an operating connection to the auxiliary airfoil, the other bell crank having its pivot axis substantially normal to the axis upon which the first airfoil is pivoted to the aircraft and having an arm spaced from the latter axis connected to control means for movement thereby about either or both of said axes.

13. In an aircraft having a first airfoil pivoted thereto and a second airfoil pivoted to the first airfoil, means for resiliently resisting relative movement of said airfoils, a member pivoted to the first airfoil about an axis substantially normal to the axis upon which the first airfoil is pivoted to the aircraft, said member having a crank arm spaced from the latter axis connected to control means for movement thereby about either or both of said axes, and an operating connection between said member and the second airfoil for moving the latter upon movement of the member relative to the first airfoil.

14. In an aircraft having a first airfoil pivoted thereto and a second airfoil pivoted to the first airfoil, a member pivoted to the first airfoil about an axis substantially normal to the axis upon which the first airfoil is pivoted to the aircraft, said member having a crank arm spaced from the latter axis connected to control means for movement thereby about either or both of said axes, and an operating connection between said member and the second airfoil for moving the latter upon movement of the member relative to the first airfoil.

HAROLD O. WENDT.